Nov. 30, 1943.    G. A. TINNERMAN    2,335,464
FASTENING DEVICE
Filed Aug. 1, 1942
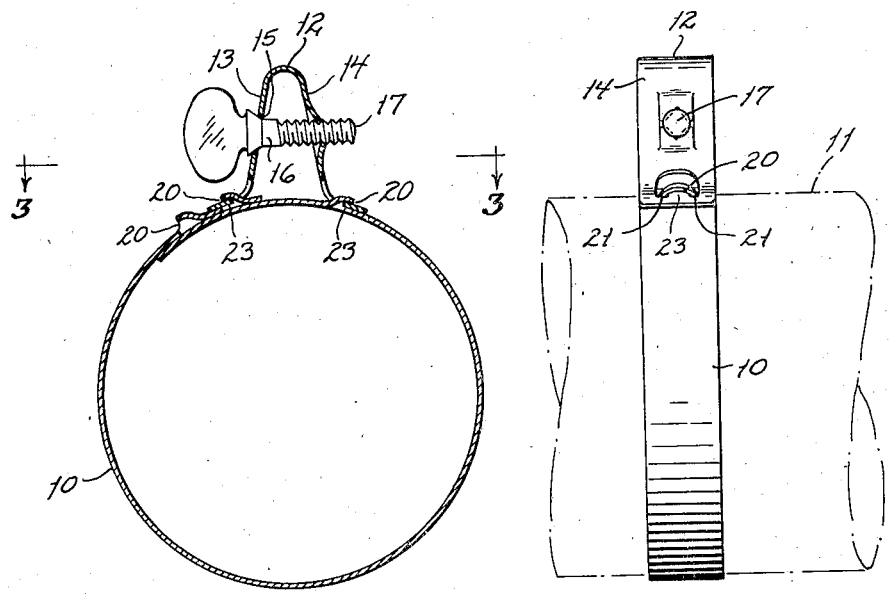
Fig. 1    Fig. 2
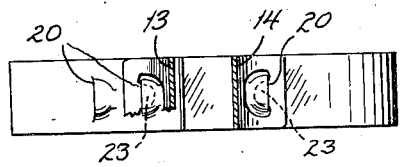    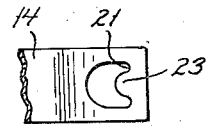
Fig. 3    Fig. 4
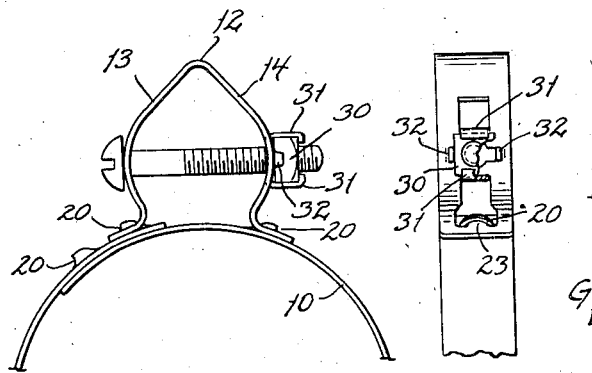    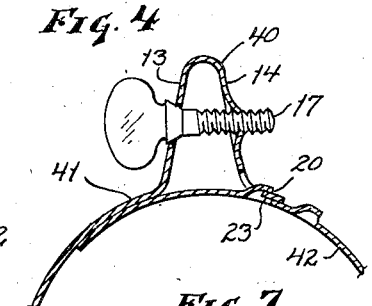
Fig. 5    Fig. 6    Fig. 7
INVENTOR.
GEORGE A. TINNERMAN
BY
Bates, Teare, & McBean
ATTORNEYS Patented Nov. 30, 1943

2,335,464

UNITED STATES PATENT OFFICE 2,335,464

FASTENING DEVICE

George A. Tinnerman, Cleveland, Ohio, assignor to Tinnerman Products, Inc., Cleveland, Ohio, a corporation of Ohio Application August 1, 1942, Serial No. 453,181

9 Claims. (Cl. 24—19)

This invention relates to a hose clamp and particularly to one which utilizes a threaded member for constricting a hose encircling band. One form of hose clamp heretofore used has embodied a band wherein a portion of each end thereof is extended outwardly and wherein a bolt and nut have been used to constrict the band by drawing the outwardly extending portions toward each other. Such a clamp has not only been limited to a narrow range of hose sizes, but has also been objectionable in that it has tended to pinch the hose in certain regions instead of distributing the clamping pressure uniformly around the periphery of the hose.

An object of the present invention is to make a hose clamp which will retain the utility of a threaded member and which at the same time will distribute the clamping stresses uniformly around the hose and will be capable of attachment in a more expeditious manner.

An additional object is to make a structure by means of which a temporary clamping engagement may be secured at one point in an assembly line and a final clamping action may be obtained at a remote point in the assembly line, thereby allowing for any necessary adjustments to other parts between the times of initial and final clamping action. The invention also contemplates a construction by means of which a given clamp may be satisfactorily used on a wider range of hose sizes than theretofore has been possible with the conventional form of nut and bolt fastener.

Referring now to the drawing, Fig. 1 is a vertical section taken through a clamp embodying my invention; Fig. 2 is a side view of the clamp; Fig. 3 is a section taken on a plane indicated by the line 3—3 in Fig. 1; Fig. 4 is a top plan view of a portion of the fastener which forms part of the clamp structure; Fig. 5 is a view showing a modified form of clamp; Fig. 6 is a side view, partly in section, of the modified structure, and Fig. 7 is a vertical section taken through another modified form of clamp.

The hose clamp embodying the present invention has a band 10 which is adapted to encircle a hose 11 and preferably in overlapping engagement, as shown in Fig. 1. My invention embodies a quick detachable connecting arrangement between the ends of the band and includes a structure which is detachable from one or both ends of the band as desired. One form of such connection includes a strip of sheet metal, the width of which is preferably the same as that of the band, which is bent intermediately as at 12 to provide two arms 13 and 14 which engage the respective ends of the band, and which are movable with relation to each other. An aperture 15 on the arm 13 is adapted to receive the shank 16 of a fastening member, such as a wing bolt 17, while the arm 14 carries a thread engaging portion to coact with the threads on the shank 16. Preferably, the thread engaging portion of the arm 14 is integral therewith and is extended out of the plane thereof and is shaped to conform to the helix of the thread on the bolt.

For the purpose of making a quick-detachable connection between the bridge piece, or connecting strip, and the ends of the band, I have shown the band member as having shoulders 20 struck outwardly therefrom, and I have shown the bridge piece as having shoulders 21 which coact with those on the band. The shoulders 20 may be the end walls of louvers that face away from each other and in effect constitute pockets into which tongues 23 on the bridge-piece arms are adapted to extend. By using a plurality of louvers on one end of the band, the bridge piece may be quickly adjusted to a size which most nearly approximates that of the hose and then the final constricting operation may be accomplished by tightening the wing bolts 17.

The louvers on the band, in effect, constitute pockets with which the tongues on the bridge piece have a close-fitting engagement, wherefore, a substantially rigid connection between the band and bridge piece is obtained before the wing bolt is tightened.

If desired, one arm of the bridge piece may be riveted or otherwise securely fastened to one end of the band, but in practice, I prefer to make both arms detachable so as to assure a smooth hose-engaging surface on the band, and to facilitate attachment at the assembly point.

A modification of my invention is shown in Figs. 5 and 6 wherein the thread-engaging portion carried by the fastener is shown in the form of a standard nut 30 which is disposed within a cage that may form part of the arm 14. The cage may comprise fingers 31 which are struck outwardly from the arm 14 and are adapted to engage opposed faces of the nut, and may also comprise lugs 32 which are also struck from the arm and are adapted to engage faces of the nut other than those engaged by the fingers 31. For the purpose of increasing the range of adjustment, I may bow the arms 13 and 14 outwardly between the intermediate point 12 and the portions thereof which engage the band, as shown in Fig. 5.

A further modification of my invention is shown in Fig. 7, wherein the bridge-piece instead of being separable, as is shown in Fig. 1, is integral with the hose encircling band and formed, as at 40, from the portion adjacent one end 41 thereof. The connecting strip may then be formed as shown in Fig. 1, or Fig. 5, to receive the threaded fastener and to engage the opposite end 42 of the band. For convenience, like parts in the assembly have been given corresponding numbers.

An advantage of the invention is the fact that a temporary clamping action may be made upon the hose, and that the parts may be so held until such time as may be convenient for tightening of the bolt. This arrangement is helpful in assembly work, particularly where it is desirable to exert enough pressure to hold the parts temporarily together while allowing sufficient freedom of movement to compensate for inaccuracies in alignment before the permanent clamping action is secured. This is especially useful in a production line assembly, where the final clamping is performed at a point remote from the temporary clamping. Additionally, the overlapping of the end portions of the band assures a uniform distribution of stresses around the hose and avoids localization of forces which otherwise would pinch the hose and tend to induce leakage.

I claim:

1. A hose clamp comprising in combination, a hose encircling band having the ends thereof in overlapping engagement and having portions thereof projecting outwardly out of the plane thereof to provide pockets, and a connecting member embodying a strip of sheet metal bent intermediately to provide two arms that are movable toward and from each other, said arms having tongues thereon adapted to enter the pockets on the bands, one of the arms having a bolt receiving opening therein and the other having a thread engaging portion in registration with said aperture, whereby a bolt may be passed through one arm and threadedly connected to the other to draw the arms toward each other and thereby to constrict the band.

2. A hose clamp comprising a hose encircling band, said band having a portion extending out of the plane and adjacent one end thereof, and having one or more portions projecting out of the plane thereof at the opposite end, said portions providing pockets, a connecting member embodying a strip of sheet metal bent intermediately to provide two arms, each arm having a tongue thereon, said tongues being adapted to enter the respective pockets on the band to hold the band in a temporary clamping position, and a threaded member extending through one of the arms and in threaded engagement with the other for drawing the arms toward each other and thereby to effect a final clamping position of the band.

3. A hose clamp comprising a hose encircling band having portions extending out of the plane thereof, and providing oppositely facing pockets adjacent the respective ends of the band, a connecting member embodying a one-piece sheet metal structure bent intermediately to provide two arms, said arms having apertures near the ends thereof into which the projecting portions of the pockets on the bands are adapted to extend, each of said arms having a tongue adjacent the aperture therein, each of said tongues being adapted to enter one of the pockets on the band and to make an interlocking connection therewith, and a threaded member extending through the arms and operating to draw them toward each other and thereby to constrict the band.

4. A hose clamp embodying a hose encircling band, said band having the ends thereof adapted to be disposed in overlapping engagement, one end of the band having a portion thereof extending outwardly and thence inwardly and providing a pair of arms that are adapted to be moved toward and from each other, said inwardly extending arm having a shoulder thereon, and the end of the band opposite that carrying the arms having a shoulder adapted to coact with the first-named shoulder for holding the band in a temporary clamping position, and means adapted to force said arms toward each other and thereby to constrict the band.

5. A hose clamp comprising a hose encircling band having one end thereof adapted to underlie the other, the overlying end having a portion thereof extending outwardly and thence inwardly to provide a pair of arms that are adapted to be moved toward each other, the underlying end of the band having a portion thereof projecting outwardly out of the plane thereof and providing a pocket, and the overlying end of the band having a tongue adapted to enter said pocket and means extending through said arm adapted to draw them together and thereby to constrict the band.

6. A hose clamp having a hose encircling member, a connecting piece comprising a strip of metal bent intermediately and having arms engaging the respective end portions of said member, at least one of said arms having an outwardly bent extreme portion having an opening adapted to receive an outward projection on the band, and means for forcing the arms toward each other, and thereby constricting the member to secure a final clamping action against the hose.

7. A hose clamp comprising in combination, a hose encircling band having the ends thereof adapted to overlap, and a connecting member for the band, said member comprising a strip of sheet metal having two arms movable toward and from each other, at least one of said arms having an outward extension adapted to lie against that portion of the band which carries the part underlapping the end portion, the region of the band engaged by the extension having a projection adapted to overhang and retain the extension, and means for forcing the arms toward each other and thereby constricting the band.

8. A hose clamp comprising a hose encircling band embodying a member having the ends thereof disposed in overlapping engagement, and means for constricting the band, said means comprising a one-piece strip of sheet metal bent intermediately and having two arms movable toward and from each other, there being outwardly flaring extensions on the arms adapted to seat against the respective end portions of the band and project beneath overhanging shoulders thereon for detachably connecting the arms to the respective end portions of the band, one of the arms having a bolt receiving opening therein and the other having a thread-engaging portion formed thereon, and a bolt extending through said opening and coacting with said thread-engaging portion to draw the arms toward each other and thereby to constrict the band.

9. A fastening device for a hose clamp comprising a one-piece strip of sheet metal bent intermediately to provide two arms, said arms having the end portions thereof extended laterally and adapted to engage a hose encircling band, interlocking projections and recesses on the band and said laterally extended portions of the fastening device, one of said arms having a bolt receiving opening therein, and the other of said arms having portions integral therewith and projecting out of the plane thereof, said portions providing a bolt receiving aperture and being shaped at the edges to conform to the helix of a bolt which is adapted to be passed through said opening and aperture and to act upon said arms for drawing them toward each other and thereby to constrict the band.

GEORGE A. TINNERMAN.